United States Patent [19]

Buuck

[11] 4,043,226
[45] Aug. 23, 1977

[54] DISENGAGE MECHANISM FOR GEAR DRIVE

[75] Inventor: Dennis L. Buuck, Lafayette, Ind.

[73] Assignee: Fairfield Manufacturing Company, Inc., Lafayette, Ind.

[21] Appl. No.: 602,836

[22] Filed: Aug. 7, 1975

Related U.S. Application Data

[63] Continuation-in-part of Ser. No. 510,505, Sept. 30, 1974, abandoned.

[51] Int. Cl.² ............. B60K 17/14; B60K 17/26; F16D 23/14; F16H 1/28
[52] U.S. Cl. .................................... 74/801; 74/391; 74/785; 180/42; 180/43 B; 180/65 F; 192/89 A; 192/93 A
[58] Field of Search ............ 70/223, 216, 217, 224; 180/65 F, 43 R, 43 B, 42; 74/785, 788, 789, 801, 391; 192/67 R, 89 A, 93 A, 93 R

[56] References Cited

U.S. PATENT DOCUMENTS

| | | | |
|---|---|---|---|
| 1,417,798 | 5/1922 | Cook et al. | 74/801 X |
| 1,632,123 | 6/1927 | Else | 74/801 |
| 1,668,553 | 5/1928 | Douglas | 70/223 |
| 1,678,798 | 7/1928 | Asprooth et al. | 74/801 |
| 1,831,955 | 11/1931 | Harney | 192/89 A |
| 1,855,697 | 4/1932 | Sullivan | 70/223 |
| 1,918,411 | 7/1933 | Lowe | 70/223 |
| 2,401,875 | 6/1946 | Lawler | 74/801 |
| 2,552,859 | 5/1951 | Nardone | 74/801 X |
| 2,706,125 | 4/1955 | Morley | 192/67 R X |
| 2,788,103 | 4/1957 | Requa | 192/93 A X |
| 2,869,662 | 1/1959 | Koup | 192/67 R X |
| 3,124,377 | 3/1964 | O'Brien et al. | 192/89 A X |
| 3,125,363 | 3/1964 | Kapusta | 192/67 R X |
| 3,184,258 | 5/1965 | Kapusta | 192/67 R X |
| 3,221,832 | 12/1965 | Holmstrom | 74/801 X |
| 3,442,361 | 5/1969 | Hegar | 192/67 R |
| 3,455,420 | 7/1969 | Blanchard | 192/93 R X |
| 3,669,476 | 6/1972 | Wilson | 192/67 R X |
| 3,753,479 | 8/1973 | Williams | 192/67 R X |
| 3,944,007 | 3/1976 | Thom et al. | 180/43 B X |
| 3,969,950 | 7/1976 | Rau et al. | 74/391 |
| 4,007,820 | 2/1977 | Kagata | 192/67 R |

Primary Examiner—Samuel Scott
Assistant Examiner—Carl F. Pietruszka
Attorney, Agent, or Firm—Woodling, Krost, Granger & Rust

[57] ABSTRACT

A disengage mechanism for a gear drive including rotatable drive and driven members with one of the members having first splines. A drive actuator having second splines and being connected to rotate with one of the members and axially movable with respect thereto between first and second positions. In the first position the first and second splines are engaged and the drive and driven members are connected to rotate together and in the second position the splines are disengaged and the drive and driven members are disconnected. First means are provided for moving the drive actuator to the first position and second means move the actuator to the second position. The first means include a spring which constantly urges the drive actuator to the first position and the second means comprises a rotatable cam member which positively engages the drive actuator to move it to the second position. Means are provided for locking the cam member to the housing of the disengage mechanism and indicia are provided so that an operator of the device will know whether the cam member is either in its first position or its second position. Additionally, the cam member is provided with a detent within which a cam follower resides in the first position of the cam member which prevents accidental movement of the drive actuator from its first position.

13 Claims, 16 Drawing Figures

DISENGAGE MECHANISM FOR GEAR DRIVE

This patent application is a continuation in-part of U.S. Patent application Ser. No. 510,505 filed Sept. 30, 1974, now abandoned and entitled "DISENGAGE MECHANISM FOR GEAR DRIVE".

The invention relates generally to a convenient mechanism for engaging and disengaging the drive and driven portions of a gear train. More specifically, the invention relates to such mechanisms which are used in so-called "motorized wheels" to connect and disconnect the driven shaft or spindle from the drive shaft.

The referred to "motorized wheels" are utilized on many vehicles, for example, on off the road type vehicles, like tractors, harvestors, excavators and lift trucks, to name a few, and these devices comprise a self-contained power drive for each wheel of the vehicle. The construction of these devices are varied; however, they usually include a drive motor which may be of the hydraulic, pneumatic or electric type and a gear reduction unit which transmits motive power to the driven wheel. The gear reduction may be of the planetary type.

It is desirable that these types of vehicles be moved by towing at high speeds from one job site to another. To this end the present invention involves itself with providing a mechanism for disengaging the gear train which is easily installed and which is readily accessible from the exterior of the wheel. The present invention, also, provides such a mechanism where a cam member positively mechanically disengages the gear train and spring means serve to engage the gear train. The "engaged" or "disengaged" mode can be easily accomplished by an operator of the vehicle from the exterior of the vehicle wheel.

The present invention includes a lock mechanism which positively locks the cam member in either one of its two positions. The mechanism, also, includes a detent on the cam member which is operative in the "engaged" mode of the device and which insures that the device cannot accidentally move to the "disengaged" mode until at least initial movement of the cam member.

Other objects and a fuller understanding of this invention may be had by referring to the following description and claims, taken in conjunction with the accompanying drawings, in which:

Figure 1:
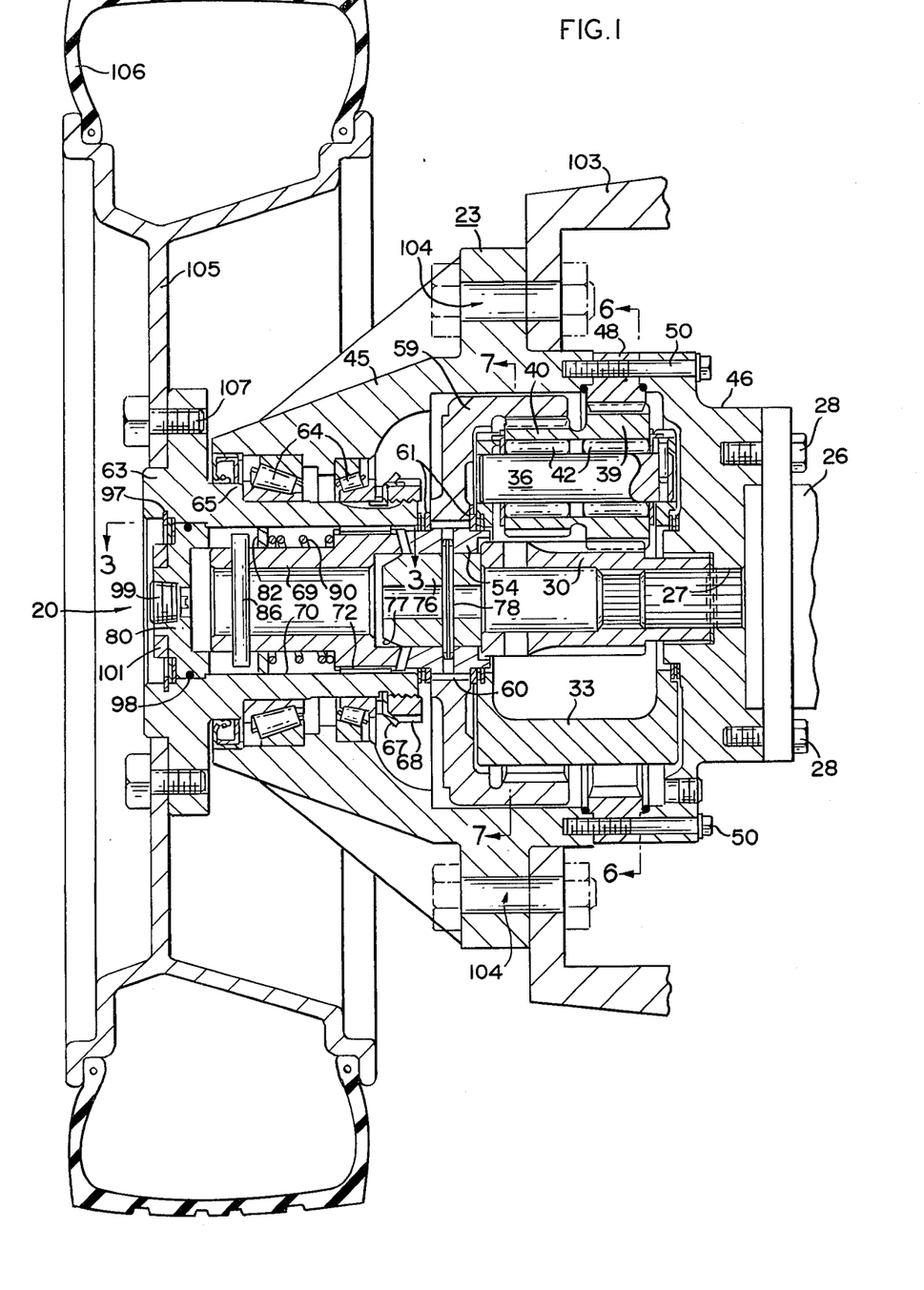
FIG. 1 is a side elevational view in section of the present invention.

The gear drive and disengage mechanism of the present invention is shown in FIG. 1 and it is identified generally by the reference numeral 20. This includes in combination a housing 23 which is made up of a stationary hub 45, a cover 46 and a first ring gear 48 interposed between the hub and cover. The hub, cover and ring gear are held in fixed relation to each other by means of bolts 50. A hydraulic drive motor 26 is secured to the cover 46 by means of bolts 28 and the drive motor has a drive shaft 27 which extends therefrom into the interior of the housing and a sun gear 30 is connected to the drive shaft in the manner shown in FIG. 1. A planet carrier 33 is located within the housing as shown and a plurality of gear shafts are carried thereby and are identified by the reference numeral 36. First and second planet gears 39 and 40, respectively, are rotatively mounted on bearings 42 and are carried by each of the gear shafts 36. These gears 39 and 40 are formed as an integral unit and may be referred to as cluster gears. The first planet gears 39 are in meshing engagement which the sun gear 30 at one portion and at another portion are in meshing engagement with the first ring gear 48.

A drive member 54 is positioned in the housing coaxial with the sun gear 30 and this drive member is provided with first face splines thereon. The first face splines are identified by the reference numeral 56. A second rotatable ring gear 59 is provided and is in meshing engagement with the second planet gear 40. The second ring gear 59 and the drive member 54 are axially positioned by means of thrust washers 61 and are rotatively connected together by means of axial splines 60.

An output spindle 63 is provided within the stationary hub 45 of the housing and is mounted upon bearings 64 carried by the stationary hub and positioned coaxial with the drive member 54. The two bearings 64 are held in position between a shoulder 65 on the spindle at one end and by means of a lock-washer 67 and a nut 68 at the other end portion.

The output spindle 63 is provided with a bore 70 within which a disengage mechanism is located and the disengage mechanism performs the function of connecting the drive member 54 to the output spindle 63 in one position and in the other position it performs the function of disengaging the drive member 54 from the output spindle 63. The disengage mechanism includes a drive actuator 69 located within the bore 70 in the output spindle 63 and the drive actuator and spindle are provided with axial splines 72 which connects the two together and which permits the drive actuator to be moved axially relative to the spindle between first and second position. The drive actuator is shown in its first or engaged position in FIG. 1 and is shown in its second or disengaged position in FIG. 2. The drive actuator 69 is provided with second face splines 74 and these second face splines are engageable with the first face splines 56 on the drive member in the first recited position of the drive actuator. When the first and second face splines are engaged, the drive member 54 is connected to the output spindle 63 and the hydraulic motor 26 performs the function of actively driving the output spindle. The splines 56 and 74 may, also, be axial splines.

In order to insure that the first and second face splines 56, 74 appropriately engage each other, there is provided a locator 76 positioned in a bore in the drive member 54 and secured there by means of a pin 78. The locator is provided with a conical surface 77 which serves to engage and/or guide the dirve actuator 69 in moving to its first position.

A cam member 80 surrounds an end portion of the drive actuator 69 opposite the second face spline 74 and is for the purpose of positively mechanically moving the drive actuator 69 from its first to its second position or in other words from its engaged position to its disengaged position. The cam member 80 is provided with two cam surfaces 82 which are identical in function and 180° removed from each other. A pin 86 extends through the drive actuator 69 and has opposed end portions which are engageable with the two cam surfaces 82. A spring 90 engages the cam member 80 at one end portion and at its other end portion abuts a shoulder 92 which is provided on the drive actuator 69. It will be noted therefore that the spring 90 at all times exerts a force on the drive actuator 69 tending to move it to the engaged position of FIG. 1.

Figure 2:
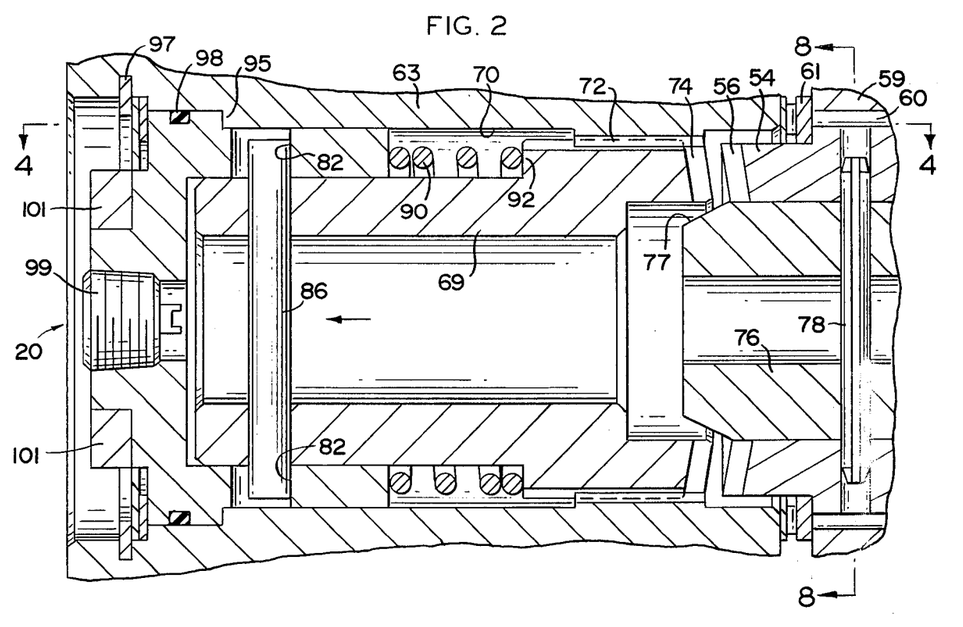
FIG. 2 is a fragmentary view of a portion of FIG. 1 showing the disengage mechanism in disengaged or disconnected position.
Figure 3:
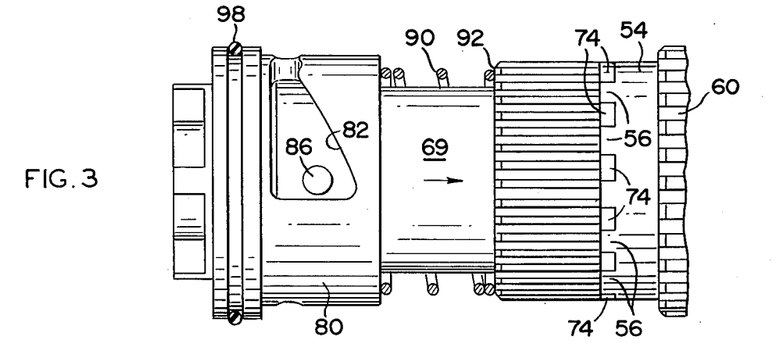
FIG. 3 is a view taken generally along the line 3—3 of FIG. 1.
Figure 4:
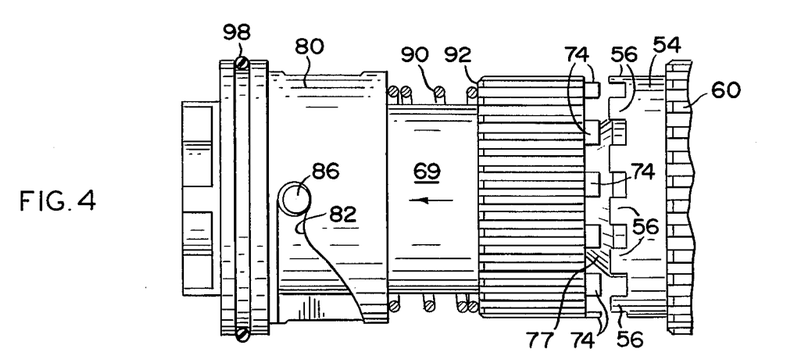
FIG. 4 is a view taken generally along the line 4—4 of FIG. 2.

The cam member 80 is rotatable between first and second position and is shown in its first position in FIGS. 1 and 3 and in its second position in FIGS. 2 and 4. It will be noted that in the first position of the cam as shown in FIG. 1, the cam surface 82 does not touch pin 86, thus removing all camming force from the pin 86 and therefore assuring that the only force acting upon the drive actuator 69 is the force exerted by spring 90. This causes the drive actuator to be axially moved to the right as shown in FIG. 1 to the engaged position of FIG. 1 which serves to connect drive member 54 to output spindle 63.

This means of engagement is highly advantageous because it will be clear to those skilled in the art that as the first face splines 56 come into engagement with the second face splines 74, they may not precisely rotatively line up intil the drive member 54 is rotated slightly. The spring 90 constantly urges the drive actuator to engaged position and once the drive member 54 is rotated slightly, by means of the motor 26, the face splines 56 and 74 will become automatically engaged. As mentioned above, this will rotatively connect the drive motor to the output spindle 63.

When it is desired to move the drive actuator 69 to the disengaged position of FIG. 2, it is only necessary to rotate cam member 80 to its second rotative position, shown in FIGS. 2 and 4, where the cam surface 82 positively engages the pin 86 moving it and actuator 69 to disengaged position. When it has been moved to disengaged position, the drive member 54 is rotatively disconnected from the output spindle 63 and the output spindle can be freely rotated at a high speed without the necessity of rotating all of the gear members in the gear train. It will thus be seen that a positive camming action disengages or disconnects the gear train and a constantly biasing force, which in this embodiment is shown as a spring, constantly urges the gear train into connected position when the positive disengaging cam is rendered ineffective.

The cam member 80 is held in its position in the bore 70 of the output spindle by means of a shoulder 95 which the cam member abuts and a snap ring 97 which holds the cam member in engagement with the shoulder. The cam member 80 is sealed on its outside diameter by means of a seal member 98 and the cam member is also, provided with lugs 101 which enable an operator of the mechanism to easily rotate the cam member. The cam member is also provided with a central threaded opening which is sealed by means of a threaded plug 99 and the plug provides an access opening for lubricant filling and for checking the lubricant level within the housing 23.

Figure 5:
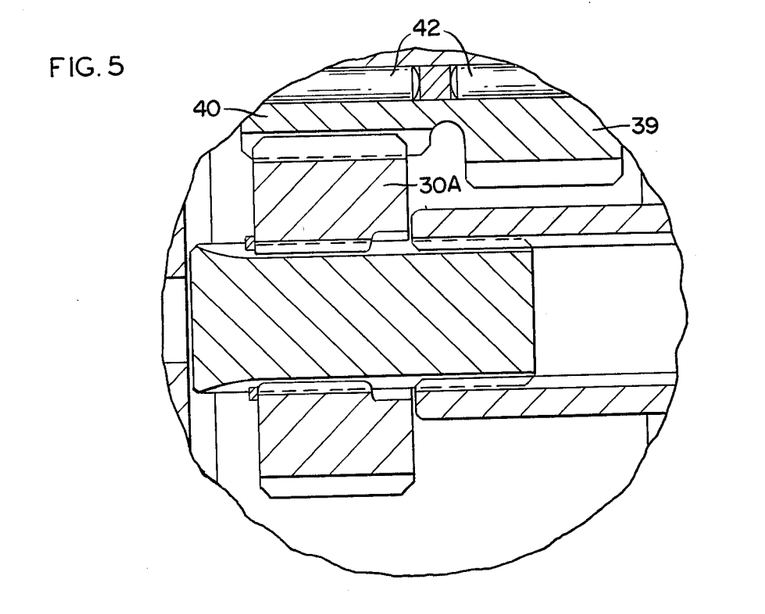
FIG. 5 is a fragmentary view showing a slightly modified form of the drive gear which is connected to the motive power source.
Figure 6:
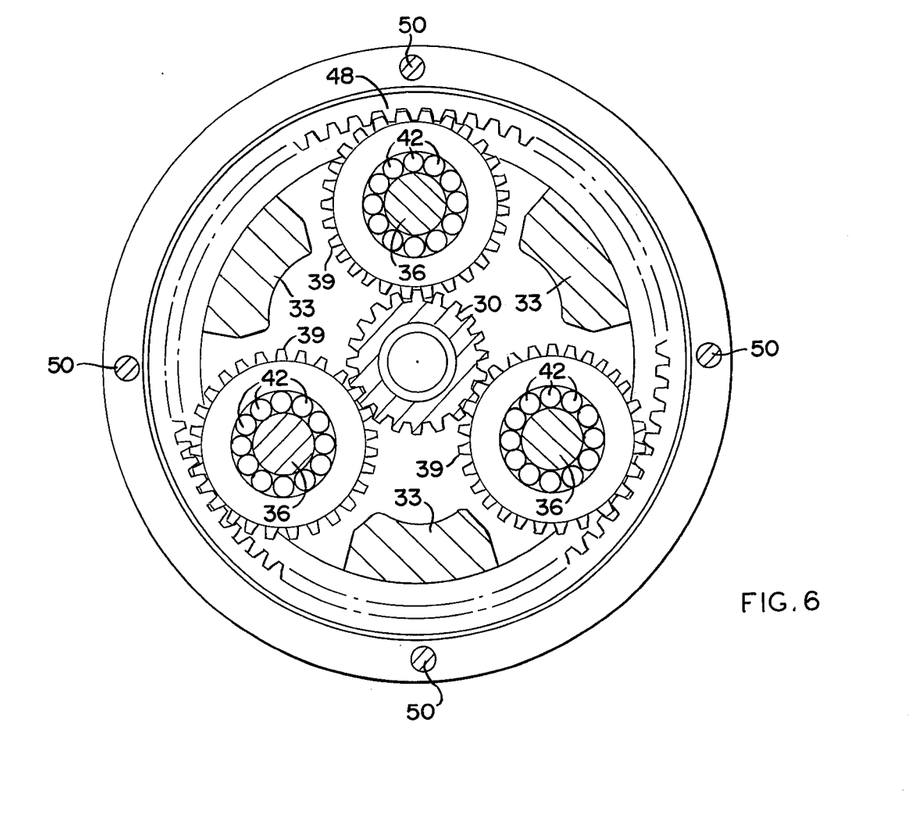
FIG. 6 is a view taken generally along the line 6—6 of FIG. 1.
Figure 7:
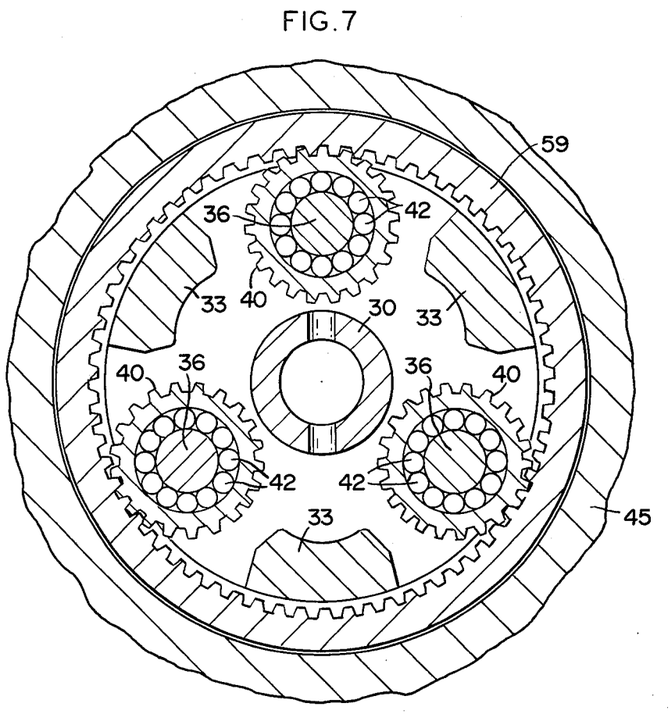
FIG. 7 is a view taken generally along the line 7—7 of FIG. 1.
Figure 8:
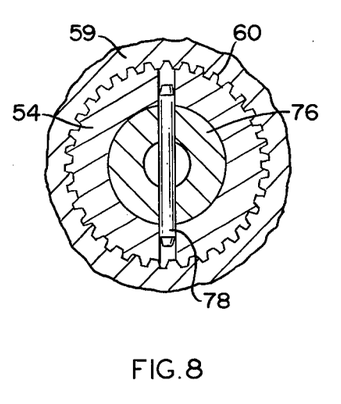
FIG. 8 is a view taken generally along the line 8—8 of FIG. 2.

The structure shown in FIG. 1, also, includes a support frame of a vehicle 103 to which the housing is fixedly secured by bolts 104. A wheel 105 carrying a tire 106 is secured to the output spindle 63 by bolts 107. FIG. 5 shows an alternate means of driving the planetary gear system from the motor 26. In this showing a sun gear 30A is secured to the drive shaft of the motor and engages the second planet gears 40 instead of planet gears 39. Otherwise, the function of the mechanism is the same and it will be appreciated that this changes the gear ratio of the drive.

In operation the drive motor 26 rotatively drives the drive member 54 by way of gears 30, 39, 40, 48 and 59. With the drive actuator held in the position of FIGS. 2 and 4 by the action of cam 80, no rotative movement is imparted to the output spindle 63 or to wheel 105. When cam 80 is rotated to the position of FIGS. 1 and 3, spring 90 urges actuator 69 to the right as seen in these figures engaging face splines 56 and 74 and connecting output spindle 63 to drive member 54 thereby rotating wheel 105.

FIGS. 9 through 16 illustrate a modification and improvement of the gear drive and disengage mechanism which is shown in FIGS. 1 through 8. The same main features found in FIGS. 1 through 8 are, also, found in FIGS. 9 through 16; however, the latter figures contain additional features which will be herein described.

In those respects where the structure is essentially the same as in the embodiment of FIGS. 1 through 8, the same identifying reference numerals will be utilized and where the structure departs, new reference numerals will be utilized to describe the new structure. In this regard in viewing FIG. 9, it will be seen that most of the structure shown in the right half of the drawing will be identified with the same reference numerals for example, as in FIG. 1 and most of the new structure and new reference numerals will be applied to the left side of the drawing of FIG. 1 which incorporates most of the new features.

The gear drive of FIGS. 9 through 16 has been indicated generally by the reference 120 and it will be seen that this embodiment of the invention includes the hydraulic motor 26 which serves to drive the planet gears 39 and 40 by way of the drive shaft 27, sun gear 30 and planet carrier 33. This embodiment, as in the case of FIGS. 1 through 8, also, includes the stationary hub 45, cover 46 and first and second ring gears 48 and 59, respectively.

Figure 9:
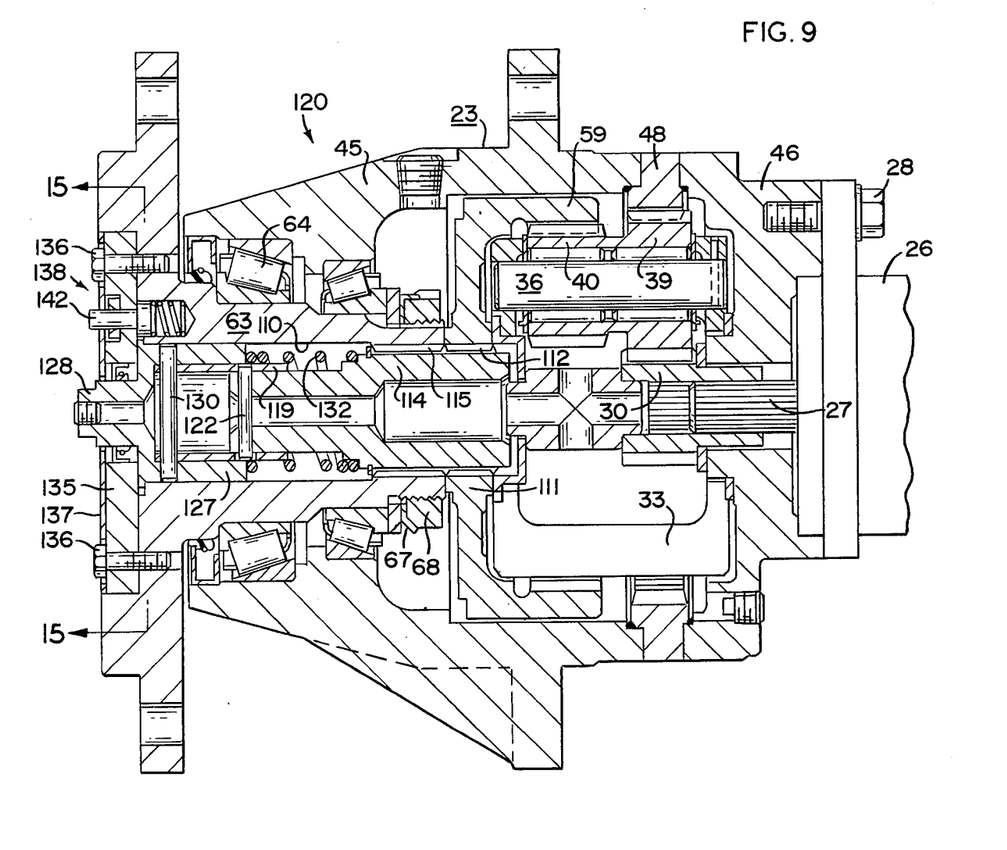
FIG. 9 is a side elevational view in section of a modified and improved structure embodying the teachings of the present invention and showing the mechanism in engaged or connected position.
Figure 10:
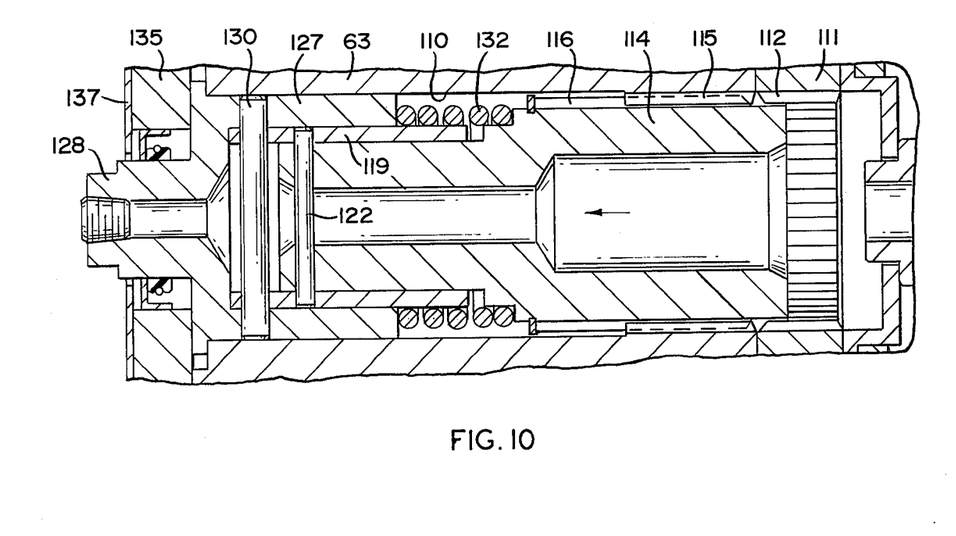
FIG. 10 is an enlarged fragmentary view of a portion of FIG. 9 showing the disengage mechanism in disengaged or disconnected position.
Figure 11:
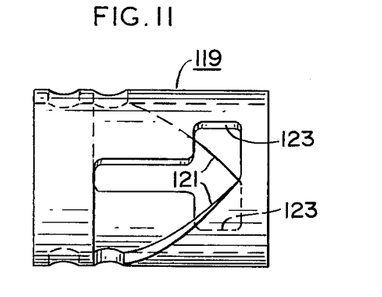
FIG. 11 is a side elevational view of the cam member shown in FIGS. 9 and 10.
Figure 12:
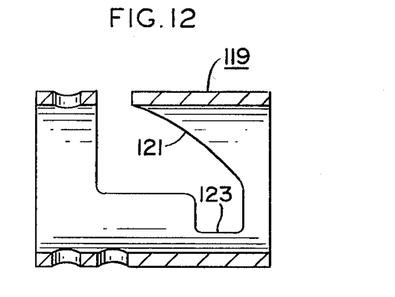
FIG. 12 is an elevational view in section of the cam shown in FIG. 11 and taken in the same direction.

In the embodiment of FIGS. 9 through 16, the second ring gear 59 is provided with what is referred to as a drive portion 111 which includes axial splines 112. A bore 110 is provided in the output spindle 63 and this bore is quite similar to bore 70; however, since most of the structure, which is located therein, is slightly different than that shown in FIGS. 1 through 8, the bore has been identified by the new number 110. A drive actuator 114 is positioned in bore 110 and is provided with axial splines 116, which engage axial splines 115 on the wall of bore 110 which intermeshing causes engagement of the drive actuator 114 with the bore 110 thereby assuring that there is no relative rotation between the drive actuator and spindle 63, but axial movement of the drive actuator 114 is permitted. The axial splines 116 on the drive actuator are, also, adapted to intermesh with the axial splines 112 on the drive portion 111 of ring gear 59 depending upon the axial position of the drive actuator. It will be seen in FIG. 9 that the drive actuator is in its most extreme axial position to the right causing engagement of the splines 112 and 116 and since the drive actuator is connected to the output spindle 63 by way of splines 115, the second ring gear 59 is connected to the output spindle and serves to rotatably drive the output spindle from the hydraulic motor 26 by way of the planetary gear system. FIG. 10 illustrates the drive actuator 114 in its second or disengaged position wherein the splines 112 and 116 do not intermesh and the output spindle is not rotatably driven through the planetary gear system.

Figure 13:
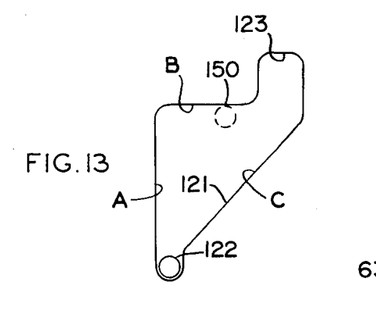
FIG. 13 is a view showing a development of one of the cam surfaces shown on the cam member illustrated in FIGS. 11 and 12.

The next structure which will be described is the structure which causes the drive actuator 114 to be moved between its engaged position (FIG. 9) and its disengaged position (FIG. 10). This structure includes a cam member 119 which surrounds a portion of the left end of the drive actuator 114, as shown in FIG. 9, and this cam member includes two cam surfaces 121 which cam surfaces are identical in configuration and simply located 180° apart. These cam surfaces 121 are adapted to act upon a cam pin 122 which extends radially through the cam member 119 and, also, radially through openings in the left end of the drive actuator 114 which serves to connect the cam member and drive actuator together. Rotation of the cam member in one direction causes the drive actuator to be moved to its engaged position and rotation in the other direction causes it to be moved back to its disengaged position as will be described more fully hereinafter. A cam actuator 127 in turn surrounds a portion of the cam member 119 and is connected to the cam member by means of a drive pin 130 which extends radially through the two parts. The cam actuator has a portion 128 which extends exteriorly of the bore 110. A spring 132 is positioned between the cam actuator 127 and a shoulder on the drive actuator 114 and this spring constantly exerts a force against the drive actuator 114 tending to move it to engaged position (FIG. 9), and whether or not the drive actuator moves to the engaged position is determined by the rotative position of the cam member 119. The cam actuator and cam member may be constructed as one integral part. FIG. 13 is a schematic view showing a development of one of the cam surfaces 121 and will be utilized hereinafter in describing the operation of the device.

Figure 16:
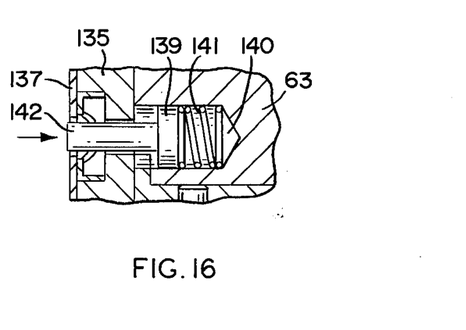
FIG. 16 is a fragmentary view of a portion of the structure shown in FIG. 9, but illustrating the lock member as being in the unlocked position as distinguished from the locked position of FIG. 9.

A retainer plate or cover 135 closes the end of the bore 110 and is held in position by threaded members 136. An instruction plate 137 resides on the outer surface of the retainer plate and is for the purpose of containing instructions to direct an operator of the device in moving the disengage mechanism between its engaged and disengaged positions. A lock member 138 is provided which extends through the retainer and instruction plates and has an enlarged head 139 which is adapted to move back and fourth in a chamber 140 and which is constantly urged in one direction by means of a spring 141 and can be moved in the other direction by means of an operator manually engaging a stem portion 142 which extends exteriorly of the retainer plate 135. The enlarged head 139 is adapted to reside in either one of first and second detents 145 and 146 which detents are provided in the periphery of the cam actuator 127 (see FIG. 15). In other words, the lock member 138 is shown in its locked position in FIG. 9, and FIG. 16 illustrates the lock member in its unlocked position, such as when depressed by an operator of the device. When the lock member 138 is in unlocked position an operator may manually engage the exterior portion 128 of the cam actuator 127 and rotate the cam actuator and, also, the cam member 119, which in turn causes either engagement or disengagement of the drive actuator depending upon the direction of rotation.

Figure 14:
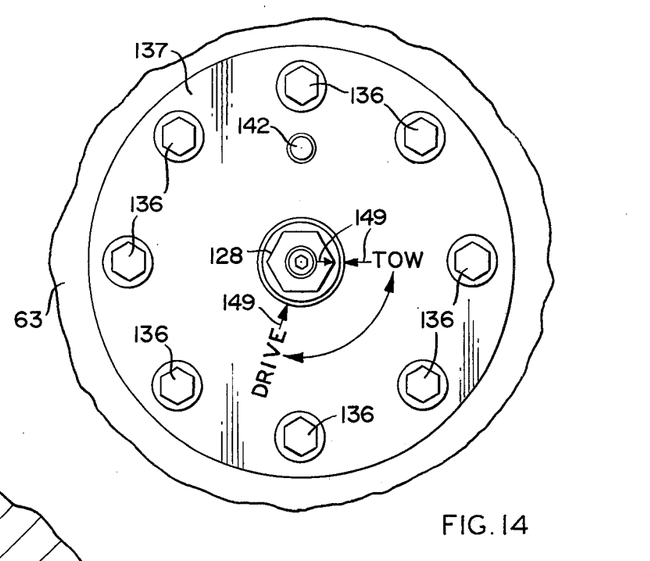
FIG. 14 is a left end view of FIG. 9, but shown in the position of FIG. 10.
Figure 15:
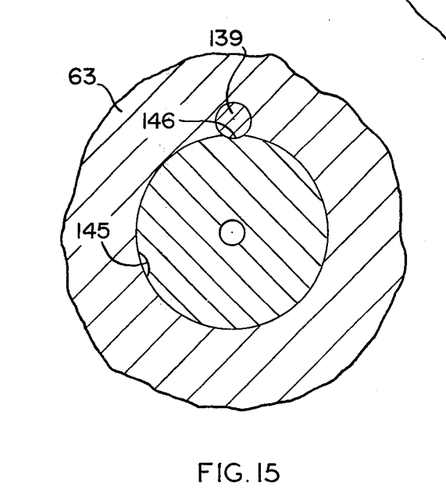
FIG. 15 is a view generally taken along the line 15—15 of FIG. 9.

The instruction plate 137 and the exterior portion 128 of cam actuator 127 carry indicia all identified by the reference numeral 149 which serve to instruct an operator of the device as to the condition of the disengage mechanism and in what direction to rotate the cam actuator so as to move the mechanism to another position. FIG. 14 illustrates the disengage mechanism as being in the disengaged condition which corresponds to the showing of FIG. 10. In order to move the disengage mechanism from the position shown in FIGS. 10 and 14, it is necessary to first push the stem portion 142 of the lock member 138 from the condition shown in FIG. 9 to the condition shown in FIG. 16 and then rotate the cam actuator 127 in a clockwise direction so the indicia on the instruction plate 137 indicates that the device is in "drive" position. This brings the first detent 145 into alignment with the enlarged head 139 of the lock member and when the lock member is released by an operator, the enlarged head will move into the first detent 145 thereby locking the cam actuator 127 and the cam member 119 in a given rotative position.

To best understand the functioning of the device, upon rotation of the cam actuator 127 in a clockwise direction as just previously described, attention is invited to the developed view of the cam surface 121 as shown in FIG. 13. Viewing FIG. 13, the turning of the cam actuator 127 in a clockwise direction is equivalent to moving the surfaces identified by letters A, B and C vertically downwardly, which in turn, by the urging of spring 132 causes the cam pin 122 to move to the right as seen in this view, down surface C, until the pin 122 has moved far enough to the right to be in alignment with the detent surface 123. Continued movement of the cam surface 121 in the downward direction places the cam pin 122 in the detent surface 123 which insures against accidental disengagement of the drive actuator and axial movement of the drive actuator to the left, until the cam actuator has been turned counterclockwise to take the cam pin 122 outside of the confines of the detent surface 123. It will, therefore, be apparent that the aforedescribed movement of the cam actuator and cam member 119, in effect, moves the cam surface 121 out of engagement or out of the way of the cam pin 122 which permits the drive actuator to move from disengaged to engaged position solely by the urging of the spring 132.

It will be apparent, therefore, that in order to move the disengage mechanism from the engaged to the disengaged position it is simply necessary to depress the lock member 138 and rotate the cam actuator 127 counterclockwise from the "drive" to the "tow" position illustrated on the instruction plate 137 seen in FIG. 14. Referring to FIG. 13 and describing the function of the cam surfaces 121 one may envision the movement of the cam surface 121 in a vertically upwardly direction, which causes the cam pin 122 to first move out of the detent surface 123 and, thereafter, the positive mechanical engagement of surface C with the cam pin 122 positively drives the cam pin back to its starting position indicated by the reference numeral 122 in FIG. 13, which positively mechanically disengages the mechansim. It is possible in the movement of the mechanism to engage position the axial splines 116 and the axial splines 112 will not mesh until they have been properly rotatively oriented so it is therefore possible that until proper rotational orientation has been achieved the cam pin 122 may momentarily occupy the position shown in FIG. 13 by the reference numeral 150. As soon as the splines are properly rotatively oriented and move to the position shown in FIG. 9, then the cam pin 122 may be moved into the confines of detent surface 123 by further rotating the cam member 119.

It will, therefore, be apparent that the present disclosure provides a gear drive and disconnect mechanism for the gear drive which enables a vehicle to be towed at high speeds from one job site to another. The disengage mechanism is provided in a readily accessible location and can be conveniently installed or removed for repair when necessary. The disengage mechanism, as mentioned hereinabove, also, provides for a positive mechanical disengaging of the gear train whereas when the gear train is engaged it is done with a biasing mechanism which constantly urges the first and second face splines together. There is no positive mechanical engaging, which insures that the face splines will not become inadvertently damaged. The face splines may be designed so that when engaged, they require a positive force to effect their disengagement.

The present disclosure illustrates how the device can function with the use of axial splines as distinguished from face splines. Also, with the use of the locking mechanism, which has been disclosed, the cam member and associated mechansim can be locked in either of two rotative positions representing engaged and disengaged positions. The provision of the detent surface at the end of the cam surface on the cam member insures that when the disengage mechanism is in its engaged and drive position it will not be accidentally disengaged. The present device has the unique advantage of having the constant urging of the spring 132 bringing the splines 112 and 116 into engagement with each other and in the event they are not rotatively aligned they will not be accidentally damaged. When they do become appropriately engaged, the provision of the detent at the end of the cam surface provides a mechanical surface or means which positively prevents accidental disengagement against the urging of the spring 132 until appropriate movement or rotation of the cam member has been effected.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A disengage mechanism for a gear drive including in combination a rotatable drive member, a rotatable driven member, one of said drive and driven members having first splines, a drive actuator secured to rotate with the other of said drive and driven members and movable in an axial direction with respect thereto between first and second positions, said drive actuator having second splines thereon engageable with said first splines in said first position and axially spaced therefrom in said second position, spring means constantly urging said drive actuator to one of said first and second positions, a cam follower connected to said drive actuator, a cam member having a cam surface which extends generally helically and which has first and second end portions, first and second recessed surfaces respectively at said first and second end portions of said cam surface, each of said recessed surfaces having an abutment surface extending generally transverse to the axis of rotation of said drive and driven members, said cam surface engageable with said cam follower and said cam member movable between first and second positions, movement of said cam member to said first position permitting said spring means to move said drive actuator to its said one of said first and second positions, said cam follower in said one of said first and second positions of said drive actuator residing in said first recessed surface adjacent a respective abutment surface and preventing axial movement of said cam follower and drive actuator, movement of said cam member to said second position causing said cam surface to engage said cam follower connected to said drive actuator and to move said drive actuator to the other of said first and second positions against the urging of said spring means, said cam follower in said other of said first and second positions of said drive actuator residing in said second recessed surface adjacent a respective abutment surface and preventing axial movement of said cam follower and drive actuator.

2. A disengage mechanism as claimed in claim 1, wherein said splines are axial splines.

3. A disengage mechanism for a gear drive including in combination a drive member rotatable about an axis, said drive member having first splines thereon, a driven output spindle rotatable about an axis, a drive actuator secured to rotate with said spindle and movable in an axial direction with respect thereto between first and second positions, said drive actuator having second splines thereon engageable with said first splines on said drive member in said first position and axially spaced therefrom in said second position, spring means constantly urging said drive actuator to said first position, a cam follower connected to said drive actuator, a cam member having a cam surface which extends generally helically and which has first and second end portions, first and second recessed surfaces respectively at said first and second end portions of said cam surface, each of said recessed surfaces having an abutment surface extending generally transverse to the axis of rotation of said drive member and spindle, said cam surface engageable with said cam follower and said cam member being rotatable between first and second positions, movement of said cam member to said first rotative position permitting said spring means to move said drive actuator to said first position, said cam follower in said first position of said drive actuator residing in said first recessed surface adjacent a respective abutment surface and preventing axial movement of said cam follower and drive actuator, movement of said cam member to said second rotative position causing said cam surface to engage said cam follower connected to said drive actuator and to move said drive actuator to its second position against the urging of said spring means, said cam follower in said second position of said drive actuator residing in said second recessed surface adjacent a respective abutment surface and preventing axial movement of said cam follower and drive actuator.

4. A disengage mechanism as claimed in claim 3, wherein said cam follower comprises a pin which extends transversely through said drive actuator and said cam member surrounds a portion of said drive actuator and said cam surface engages said pin to move said drive actuator to said second position.

5. A disengage mechanism as claimed in claim 4, wherein said spring means acts between said cam member and said drive actuator to urge said drive actuator to said first position.

6. A gear drive as claimed in claim 3, wherein lock means are provided and operatively act between said output spindle and said cam member to mechanically lock said cam member in either one of its first and second positions.

7. A gear drive as claimed in claim 3, wherein a cam actuator is provided which is carried by said output spindle and which has a portion axially coextensive with said cam member, means connecting said cam actuator and said cam member whereby rotation of said cam actuator causes rotation of said cam member, said cam actuator having a portion extending exteriorly of said output spindle which portion is provided with indicia, indicia on the exterior of said output spindle cooperating with said first mentioned indicia to indicate the position of said cam member.

8. A gear drive including in combination a housing, a planetary gear train in said housing having an input and an output, a drive motor having a drive shaft extending into said housing and operatively connected to said planetary gear train input to drive said planetary gear train, a rotatable output spindle, a drive actuator carried by said output spindle and being connected to said spindle to rotate therewith and with the connection permitting axial movement of said drive actuator between first and second positions relative to said spindle, said drive actuator having splines thereon operatively connected to said planetary gear train in said first position of said drive actuator to connect said drive motor to said spindle, said drive actuator in said second position disconnecting said spindle from said drive motor, an annular sleeve-shaped cam member carried by said output spindle and having a generally helically extending cam surface thereon, said cam surface having first and second end portions, said cam member surrounding at least a portion of said drive actuator, a pin carried by said drive actuator and engageable with said cam surface, first and second recessed surfaces respectively at said first and second end portions of said cam surface, each of said recessed surfaces having an abutment surface extending generally transverse to said axial movement of said drive actuator, said cam member being rotatable between first and second positions, a spring operatively acting on said drive actuator to at all times urge said drive actuator to its said first position, movement of said cam member to said first rotative position permitting said spring means to move said drive actuator to its said first position, said pin in said first position of said drive actuator residing in said first recessed surface adjacent a respective abutment surface and preventing axial movement of said pin and drive actuator, movement of said cam member to said second rotative position causing said cam surface to engage said pin connected to said drive actuator and to move said drive actuator to its said second position against the urging of said spring means, said pin in said second position of said drive actuator residing in said second recessed surface adjacent a respective abutment surface and preventing axial movement of said pin and drive actuator.

9. A gear drive as claimed in claim 8, wherein lock means are provided and operatively act between said output spindle and said cam member to mechanically lock said cam member in either one of its first and second positions.

10. A gear drive as claimed in claim 8, wherein a cam actuator is provided which is carried by said output spindle and which has a portion axially coextensive with said cam member, means connecting said cam actuator and said cam member whereby rotation of said cam actuator causes rotation of said cam member, said cam actuator having a portion extending exteriorly of said output spindle which portion is provided with indicia, indicia on the exterior of said output spindle cooperating with said first mentioned indicia to indicate the position of said cam member.

11. A gear drive and disengage mechanism including in combination a housing, a drive motor secured to said housing and having a drive shaft extending into said housing, a sun gear secured to said drive shaft, a planet carrier, a gear shaft carried by said planet carrier, first and second planet gears rotatively carried by said gear shaft with said first planet gear being in meshing engagement with said sun gear, said first and second planet gears being secured together, said housing including a stationary hub, a cover, a first ring gear interposed between said hub and cover and secured thereto by threaded members, said first planet gear being in meshing engagement with said first ring gear, a drive member in said housing positioned coaxial with said sun gear and having first face splines thereon, a second rotatable ring gear secured to said drive member, said second planet gear being in meshing engagement with said second ring gear, an output spindle rotatably mounted on bearings carried by said stationary hub and positioned coaxial with said drive member, a drive actuator located within said bore in said output spindle and having axial splines connecting said drive actuator to said spindle and permitting axial movement of said drive actuator between first and second positions relative to said spindle, said drive actuator having second face splines thereon engageable with said first face splines in said first position of said drive actuator to connect said drive member to said spindle, said drive actuator in said second position disconnecting said spindle from said drive member, a locator carried by said drive member and having a conical surface to engage said drive actuator to position said first and second face splines upon movement of said drive actuator to said first position, a cam member surrounding one end portion of said drive actuator and having a cam surface thereon, a pin carried by said drive actuator and engageable with said cam surface, a spring engaging said cam member at one end and engaging said drive actuator at the other end to at all times urge said drive actuator to its said first position, said cam member being rotatable between first and second positions and in said first position removing camming force from said pin and permitting said spring to move said drive actuator to its said first position, said cam member in its said second position causing said cam surface to engage said pin with a camming force to positively move said drive actuator to its said second position against the urging of said spring.

12. A gear drive including in combination a housing, a drive motor secured to said housing and having a drive shaft extending into said housing, a sun gear secured to said drive shaft, a planet carrier, planet gear means carried by said planet carrier, said planet gear means being in meshing engagement with said sun gear, a drive member in said housing positioned coaxial with said sun gear and having first face splines thereon, a rotatable ring gear secured to said drive member, said planet gear means being in meshing engagement with said ring gear, reaction means acting on said planet gear means, a rotatable output spindle positioned coaxial with said drive member, a drive actuator connected to said spindle and being axially movable relative to said spindle, said drive actuator having second face splines thereon engageable with said first face splines in said first position of said drive actuator to connect said drive member to said spindle, said drive actuator in said second position disconnecting said spindle from said drive member, a cam member surrounding one end portion of said drive actuator and having a cam surface thereon, a pin carried by said drive actuator and engageable with said cam surface, a spring engaging said cam member at one end and engaging said drive actuator at the other end to at all times urge said drive actuator to its said first position, said cam member being rotatable between first and second positions and in said first position removing camming force from said pin and permitting said spring to move said drive actuator to its first position, said cam member in its said second position causing said cam surface to engage said pin with a camming force to positively move said drive actuator to its said second position against the urging of said spring.

13. A gear drive and disengage mechanism including in combination a housing, a drive motor secured to said housing and having a drive shaft extending into said housing, a sun gear secured to said drive shaft, a planet carrier, a gear shaft carried by said planet carrier, first and second planet gears rotatively carried by said gear shaft with said first planet gear being in meshing engagement with said sun gear, said first and second planet gears being secured together, said housing including a stationary hub, a cover, a first ring gear interposed between said hub and cover and secured thereto, said first planet gear being in meshing engagement with said first ring gear, a second rotatable ring gear having a drive portion with first axial splines, said second planet gear being in meshing engagement with said second ring gear, an output spindle rotatably mounted on bearings carried by said stationary hub and positioned coaxial with said second rotatable ring gear, wall means defining a bore extending axially into said output spindle, a drive actuator located within said bore in said output spindle and having means connecting said drive actuator to said spindle and permitting axial movement of said drive actuator between first and second positions relative to said spindle, said drive actuator having second axial splines thereon engageable with said first axial splines in said first position of said drive actuator to connect said drive portion of said second ring gear to said spindle, said drive actuator in said second position disconnecting said spindle from said drive portion of said second ring gear, a cam member surrounding one portion of said drive actuator and having a cam surface thereon, a pin carried by said drive actuator and engageable with said cam surface, a spring engaging said drive actuator to at all times urge said drive actuator to its said first position, said cam member being rotatable between first and second positions and in moving to said first position removing camming force from said pin and permitting said spring to move said drive actuator to its said first position, said cam member in moving to its said second position causing said cam surface to engage said pin with a camming force to positively move said drive actuator to its said second position against the urging of said spring, a cam actuator surrounding at least a portion of said cam member and extending exteriorly of said bore in a position to be manipulated by an operator of the gear drive and disengage mechanisms, a drive pin extending through said cam actuator and said cam member to connect the two together whereby rotation of said cam actuator causes rotation of said cam member between its said first and second positions, a retainer plate secured to said output spindle to close said bore and having an opening through which said cam actuator extends, a lock member carried by said retainer plate and movable between locked and unlocked positions, spring means constantly urging said lock member to locked position, wall means on the periphery of said cam actuator defining first and second angularly spaced detents with said lock member residing in said first detent in said first position of said cam member and residing in said second detent in said second position of said cam member, indicia on said retainer plate and said cam actuator to visually indicate the position of said cam actuator and said cam member, said cam surface of said cam member having a detent portion to receive said pin carried by said drive actuator in said first position of said cam member which insures against axial movement of said drive actuator from its said first position until initial rotation of said cam member to remove said pin from said detent portion of said cam surface.

* * * * *